US012724216B2

(12) United States Patent
Yamashita et al.

(10) Patent No.: US 12,724,216 B2
(45) Date of Patent: Sep. 1, 2026

(54) OPTICAL FIBER RIBBON

(71) Applicant: Fujikura Ltd., Tokyo (JP)

(72) Inventors: Noriaki Yamashita, Sakura (JP); Itaru Ishida, Sakura (JP); Ken Osato, Sakura (JP)

(73) Assignee: Fujikura Ltd., Tokyo (JP)

( * ) Notice: Subject to any disclaimer, the term of this patent is extended or adjusted under 35 U.S.C. 154(b) by 290 days.

(21) Appl. No.: 18/578,638

(22) PCT Filed: Apr. 25, 2022

(86) PCT No.: PCT/JP2022/018749
§ 371 (c)(1), (2) Date: Jan. 11, 2024

(87) PCT Pub. No.: WO2023/286415
PCT Pub. Date: Jan. 19, 2023

(65) Prior Publication Data
US 2024/0319463 A1 Sep. 26, 2024

(30) Foreign Application Priority Data
Jul. 13, 2021 (JP) ................................ 2021-115536

(51) Int. Cl.
*G02B 6/255* (2006.01)
*G02B 6/44* (2006.01)

(52) U.S. Cl.
CPC ............ *G02B 6/4403* (2013.01); *G02B 6/255* (2013.01); *G02B 6/4429* (2013.01)

(58) Field of Classification Search
CPC ..... G02B 6/255; G02B 6/4403; G02B 6/4429
See application file for complete search history.

(56) References Cited

U.S. PATENT DOCUMENTS 6,173,101 B1 1/2001 Bourghelle
9,389,386 B2 * 7/2016 Matsuzawa .......... G02B 6/4404
(Continued)

FOREIGN PATENT DOCUMENTS

CN 103608710 A 2/2014
CN 110959127 A 4/2020
(Continued)

OTHER PUBLICATIONS

International Search Report issued in corresponding International Application No. PCT/JP2022/018749 mailed Jun. 7, 2022 (2 pages).
(Continued)

*Primary Examiner* — Ryan A Lepisto
(74) *Attorney, Agent, or Firm* — Osha Bergman Watanabe & Burton LLP

(57) ABSTRACT

An optical fiber ribbon includes five or more optical fibers disposed in a disposition direction perpendicular to a longitudinal direction of the optical fiber ribbon and connection parts disposed intermittently in the longitudinal and disposition directions. Each of the connection parts is disposed between and connects adjacent ones of the optical fibers. The optical fiber ribbon has a first high-density region and a first low-density region disposed at different positions in the longitudinal direction and a second high-density region and a second low-density region disposed at different positions in the longitudinal direction. At least two of the connection parts having different positions from each other in the longitudinal and disposition directions are disposed in the first high-density region. At least another two of the connection parts having different positions from each other in the longitudinal and disposition directions are disposed in the second high-density region.

11 Claims, 6 Drawing Sheets

(56) References Cited

U.S. PATENT DOCUMENTS

| | | | | |
|---|---|---|---|---|
| 10,101,549 | B2 * | 10/2018 | Hoshino | G02B 6/441 |
| 10,514,517 | B2 * | 12/2019 | Sato | H01B 7/08 |
| 10,688,740 | B2 * | 6/2020 | Moriya | G02B 6/4403 |
| 10,718,917 | B2 * | 7/2020 | Fallahmohammadi | G02B 6/4404 |
| 10,882,783 | B2 * | 1/2021 | Tanaka | C03C 25/24 |
| 11,300,741 | B2 * | 4/2022 | Sahoo | G02B 6/448 |
| 11,947,174 | B2 * | 4/2024 | Mishra | G02B 6/441 |
| 2017/0184803 | A1 | 6/2017 | Namazue et al. | |
| 2018/0273427 | A1 | 9/2018 | Tanaka et al. | |
| 2020/0064574 | A1 * | 2/2020 | Fallahmohammadi | G02B 6/4404 |

FOREIGN PATENT DOCUMENTS

| | | | |
|---|---|---|---|
| CN | 112969947 | A | 6/2021 |
| EP | 3614188 | A1 | 2/2020 |
| JP | 2012234122 | A | 11/2012 |
| JP | 2014-202795 | A | 10/2014 |
| JP | 2020-030407 | A | 2/2020 |
| JP | 2020-181048 | A | 11/2020 |
| JP | 2021-043363 | A | 3/2021 |
| KR | 20170055955 | A | 5/2017 |
| TW | 201612566 | A | 4/2016 |
| TW | 202102589 | A | 1/2021 |
| WO | 2018/182670 | A1 | 10/2018 |

OTHER PUBLICATIONS

Office Action issued in Taiwanese Application No. 111117486; Dated Apr. 24, 2023 (12 pages).

Office Action issued in corresponding Chinese Patent Application No. 202280045857.8, dated Apr. 15, 2026 (8 pages).

* cited by examiner

3
B
B
20
20
S1
D1
D1R, D1RE
D1L, D1LE
10(11R, 11L)
G
A1
A2
20
20
B
B
D2
S2
D2R, D2RE
10(12R, 12L)
D2L, D2LE
G
+X
-X
+Y
-Y

4
D1L, D1LE
10(11L)
10(11R)
D1
D1R, D1RE
S1
D1
S1
G
G
A1
A2
B
B
20
20
20
20
B
B
+Y
-X
+X
-Y
S2
D2
D2L, D2LE
10(12L)
10(12R)
D2R, D2RE
S2
D2

6
S1
D1
S1
D1
D1R, D1RE
D1L, D1LE
B
B
20
20
G
A1
A2
20
20
B
B
D2
S2
D2R, D2RE
10(12R, 12L)
D2
D2L, D2LE
G
S2
+X
-X
+Y
-Y

OPTICAL FIBER RIBBON

CROSS-REFERENCE TO RELATED APPLICATIONS

The present application claims priority to Japanese Patent Application No. 2021-115536, filed Jul. 13, 2021. The contents of this application are incorporated herein by reference in their entirety.

BACKGROUND

Technical Field

The present invention relates to an optical fiber ribbon.

Description of the Related Art

Patent Document 1 discloses an optical fiber ribbon including a plurality of optical fibers disposed in a disposition direction perpendicular to a longitudinal direction, and a plurality of connection parts. The plurality of connection parts are formed between two optical fibers adjacent in the disposition direction, and connects the two optical fibers.

Patent Document

Patent Document 1: Japanese Patent Publication No. 2021-43363

The optical fiber ribbon of Patent Document 1 has a plurality of high-density regions (connected regions) and a plurality of low-density regions (unconnected regions) that are alternately disposed in the longitudinal direction. At least two connection parts are disposed in each of the plurality of high-density regions. In each of the plurality of low-density regions, a connection part that fixes a disposition pitch between two adjacent optical fibers is not disposed. On the other hand, the optical fiber ribbon may be used as an optical fiber cable by being wrapped in, for example, a wrapping member, a sheath, or the like. In manufacturing such an optical fiber cable, a method in which an optical fiber ribbon and other constituent members (a wrapping member, a sheath, or the like) are joined together while the optical fiber ribbon is moved in the longitudinal direction is often employed.

Incidentally, a portion of the optical fiber ribbon in which the connection part is formed has a higher rigidity than the other portions. Therefore, a rigidity of the optical fiber ribbon in each low-density region is likely to be lower than a rigidity of the optical fiber ribbon in each high-density region. For example, in the optical fiber ribbon of Patent Document 1, the high-density regions with a high rigidity and the low-density regions with a low rigidity are alternately disposed in the longitudinal direction. When the optical fiber ribbon is moved at the time of manufacturing optical fiber cables, there is a likelihood that the optical fiber ribbon will become corrugated or twisted in a portion in which the rigidity is low. Such corrugation or undulation of the optical fiber ribbon may hinder smooth manufacture of optical fiber cables.

SUMMARY

One or more embodiments provide an optical fiber ribbon with enhanced rigidity.

An optical fiber ribbon according to one or more embodiments includes five or more optical fibers disposed in a disposition direction perpendicular to a longitudinal direction, and a plurality of connection parts formed between two of the optical fibers adjacent in the disposition direction to connect the two optical fibers, in which the plurality of connection parts are disposed intermittently in the longitudinal direction and the disposition direction, and the optical fiber ribbon includes at least one first high-density region and at least one first low-density region disposed at different positions in the longitudinal direction, and at least one second high-density region and at least one second low-density region disposed at different positions in the longitudinal direction, in which at least two connection parts having different positions from each other in the longitudinal direction and the disposition direction among the plurality of connection parts are disposed in the first high-density region, at least two connection parts having different positions from each other in the longitudinal direction and the disposition direction among the plurality of connection parts are disposed in the second high-density region, a number density of the connection parts in the first low-density region is lower than a number density of the connection parts in the first high-density region, a number density of the connection parts in the second low-density region is lower than a number density of the connection parts in the second high-density region, and a dimension L9 in the longitudinal direction of a portion in which the first low-density region and the second low-density region overlap in the disposition direction is smaller than a dimension L6 of the first low-density region in the longitudinal direction and a dimension L8 of the second low-density region in the longitudinal direction.

According to one or more embodiments, it is possible to provide an optical fiber ribbon with enhanced rigidity.

DESCRIPTION OF THE EMBODIMENTS

First Example

Hereinafter, an optical fiber ribbon according to a first example according to one or more embodiments will be described on the basis of the drawings.

Figure 1:
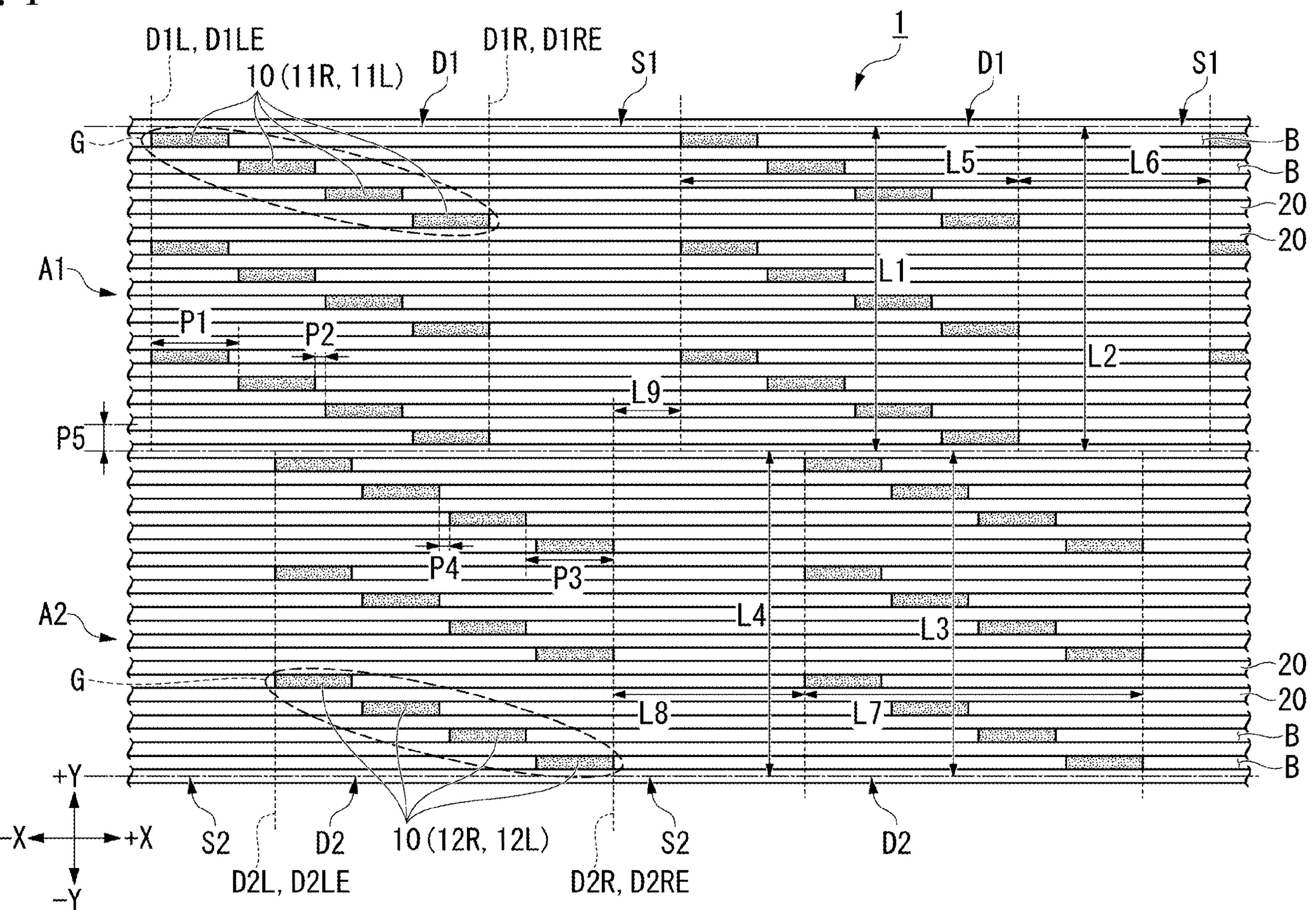
FIG. 1 is a plan view illustrating an optical fiber ribbon according to a first example.

As illustrated in FIG. 1, an optical fiber ribbon 1 includes a plurality of optical fibers 20. The plurality of optical fibers 20 are disposed in a direction perpendicular to a longitudinal direction of each optical fiber 20. The optical fiber ribbon 1 further includes a plurality of connection parts 10 connecting two optical fibers 20 adjacent to each other among the plurality of optical fibers 20.

In the example of FIG. 1, the number of the optical fibers 20 included in the optical fiber ribbon 1 is twenty five. However, the number of the optical fibers 20 may be changed as appropriate, and the number of the optical fibers 20 is not limited as long as it is five or more.

Definition of Directions

Here, in the present example, a longitudinal direction of the optical fiber ribbon is simply referred to as a longitudinal direction X. One direction in the longitudinal direction X is referred to as a +X direction or a rightward direction. A direction opposite to the +X direction is referred to as a −X direction or a leftward direction. A direction in which the plurality of optical fibers 20 are disposed is referred to as a disposition direction Y. The disposition direction Y is orthogonal to the longitudinal direction X. One direction in the disposition direction Y is referred to as a +Y direction or an upward direction. A direction opposite to the +Y direction is referred to as a −Y direction or a downward direction. A direction orthogonal to the longitudinal direction X and the disposition direction Y is referred to as a surface normal direction Z.

The optical fibers 20 each have a waveguide and a coating part (not illustrated). The waveguide is formed of, for example, glass. The waveguide has a core and a cladding. The coating part is formed of a resin or the like and covers a glass part. As a specific material for the coating part, for example, a UV curable resin may be given.

Each optical fiber 20 extends in the longitudinal direction X. The plurality of optical fibers 20 are disposed in the disposition direction Y. A gap may be provided between two optical fibers 20 adjacent in the disposition direction Y, or the two optical fibers 20 may be in contact with each other. In the optical fiber ribbon 1 according to the present example, the plurality of optical fibers 20 are disposed at substantially constant intervals (disposition pitch P5) in the disposition direction Y. Hereinafter, a gap or a contact surface between two optical fibers 20 adjacent in the disposition direction Y will be referred to as an inter-fiber region B. In the example of FIG. 1, twenty five optical fibers 20 and twenty four inter-fiber regions B are alternately disposed in the disposition direction Y.

The plurality of connection parts 10 are each formed in the inter-fiber region B. The plurality of connection parts 10 are disposed intermittently in the longitudinal direction X and the disposition direction Y. In the present specification, the plurality of connection parts 10 being "intermittently disposed" includes both cases in which the intervals between the connection parts 10 are constant and the intervals between the connection parts 10 are not constant. Each of the connection parts 10 connects two optical fibers 20 adjacent to the inter-fiber region B in which the connection part 10 is disposed. More specifically, each connection part 10 connects coating parts of two optical fibers 20 adjacent to the inter-fiber region B in which the connection part 10 is disposed. That is, in the optical fiber ribbon 1 according to the present example, two optical fibers 20 adjacent in the disposition direction Y are intermittently connected to each other in the longitudinal direction X by the plurality of connection parts 10. The optical fiber ribbon 1 is also referred to as an intermittently-fixed optical fiber ribbon 1. As the connection part 10, any material capable of connecting coating parts of adjacent optical fibers 20 may be used. For example, a UV curable resin may be used as the connection part 10.

The optical fiber ribbon 1 according to the present example includes a plurality of first high-density regions D1, a plurality of first low-density regions S1, a plurality of second high-density regions D2, and a plurality of second low-density regions S2. The plurality of first high-density regions D1 and the plurality of first low-density regions S1 are alternately disposed in the longitudinal direction X. The plurality of second high-density regions D2 and the plurality of second low-density regions S2 are alternately disposed in the longitudinal direction X. In the present example, the first high-density regions D1 and the second high-density regions D2 are disposed at different positions in the disposition direction Y.

In the present example, a dimension L1 of each of the first high-density regions D1 in the disposition direction Y and a dimension L2 of each of the first low-density regions S1 in the disposition direction Y are substantially equal to each other. A dimension L3 of each of the second high-density regions D2 in the disposition direction Y and a dimension L4 of each of the second low-density regions S2 in the disposition direction Y are substantially equal to each other. Also, the dimension L1 and the dimension L3 may be substantially equal to each other. In the present example, a dimension of each first high-density region D1 in the longitudinal direction X is substantially constant at a dimension L5. A dimension of each first low-density region S1 in the longitudinal direction X is substantially constant at a dimension L6. A dimension of each second high-density region D2 in the longitudinal direction X is substantially constant at a dimension L7. A dimension of each second low-density region S2 in the longitudinal direction X is substantially constant at a dimension L8. However, each of the dimensions L5 to L8 may not be substantially constant. Also, the dimension L5 and the dimension L7 may be substantially equal to each other. The dimension L6 and the dimension L8 may be substantially equal to each other. In the present example, the regions D1, D2, S1, and S2 each include thirteen optical fibers 20 and twelve inter-fiber regions B.

A region in which the plurality of first high-density regions D1 and the plurality of first low-density regions S1 are combined is referred to as a first region A1. A region in which the plurality of second high-density regions D2 and the plurality of second low-density regions S2 are combined is referred to as a second region A2. In the present example, the first region A1 and the second region A2 are adjacent to each other in the disposition direction Y. Note that, the first region A1 and the second region A2 may not be adjacent to each other in the disposition direction Y.

In the present example, each of the plurality of first high-density regions D1, each of the plurality of first low-density regions S1, each of the plurality of second high-density regions D2, and each of the plurality of second low-density regions S2 are formed in a substantially rectangular shape. Hereinafter, a right end edge of each first high-density region D1 may be referred to as a first right end edge DIRE, and a left end edge of each first high-density region D1 may be referred to as a first left end edge D1LE. Similarly, a right end edge of each second high-density region D2 may be referred to as a second right end edge D2RE, and a left end edge of each second high-density region D2 may be referred to as a second left end edge D2LE. In the present example, the end edges DIRE, D1LE, D2RE, and D2LE are each a line segment parallel to the disposition direction Y. At least one connection part 10 is disposed to be in contact with each of the end edges DIRE, D1LE, D2RE, and D2LE.

In the present example, the first right end edge DIRE of each first high-density region D1 is also a left end edge of the first low-density region S1 that is adjacent to the right side of the first high-density region D1. Similarly, the first left end edge D1LE of each first high-density region D1 is also a right end edge of the first low-density region S1 that is adjacent to the left side of the first high-density region D1. That is, each first high-density region D1 and each first low-density region S1 are defined by each first right end edge DIRE and each first left end edge D1LE. In the present example, the second right end edge D2RE of each second high-density region D2 is also a left end edge of the second low-density region S2 that is adjacent to the right side of the second high-density region D2. Similarly, the second left end edge D2LE of each second high-density region D2 is also a right end edge of the second low-density region S2 that is adjacent to the left side of the second high-density region D2. That is, each second high-density region D2 and each second low-density region S2 are defined by each second right end edge D2RE and each second left end edge D2LE.

Hereinafter, configurations of each of the first high-density regions D1 and each of the first low-density regions S1 will be described.

In each first high-density region D1, among the plurality of connection parts 10, at least two connection parts 10 having different positions from each other in the longitudinal direction X and the disposition direction Y are disposed. In the example of FIG. 1, twelve connection parts 10 are disposed in each first high-density region D1. In the example of FIG. 1, a disposition pattern of the twelve connection parts 10 included in each first high-density region D1 is substantially the same between the first high-density regions D1. More specifically, three connection part groups G are disposed in each first high-density region D1, and the three connection part groups G are disposed in the disposition direction Y. Within each of the connection part groups G, four connection parts 10 are disposed to be continuous in a straight line. In other words, within each first high-density region D1, the twelve connection parts 10 are disposed periodically in the disposition direction Y with four connection parts 10 (connection part group G) as one unit. Note that, the number of connection parts 10 included in each connection part group G may be changed as appropriate, and the number of the connection parts 10 is not limited as long as it is two or more. Within each connection part group G, the plurality of connection parts may be disposed to be continuous in a curved shape. Also, the number of the connection part groups G included in each first high-density region D1 may be changed as appropriate. The number of the connection parts 10 included in each first high-density region D1 may be changed as appropriate, and the number of the connection parts 10 is not limited as long as it is two or more.

In the example of FIG. 1, within each connection part group G, four connection parts 10 are disposed at a substantially constant pitch P1 in the longitudinal direction X. Also, the four connection parts 10 are disposed at substantially constant intervals P2 in the longitudinal direction X. Note that, the four connection parts 10 may be disposed without the intervals P2 in the longitudinal direction X. That is, the connection parts 10 may overlap each other in the disposition direction Y. Also, within each connection part group G, an inter-fiber region B in which a certain connection part 10 is disposed and an inter-fiber region B in which a connection part 10 closest to the above-described connection part 10 is disposed are adjacent in the disposition direction Y. Here, in each connection part group G, the connection part 10 positioned on an uppermost side among the four connection parts 10 included in the connection part group G is referred to as an upper end connection part. In each connection part group G, the connection part 10 positioned on a lowermost side among the four connection parts 10 included in the connection part group G is referred to as a lower end connection part. In the present example, the three connection part groups G are adjacent in the disposition direction Y. For example, the inter-fiber region B in which the upper end connection part of the connection part group G positioned at a center among the three connection part groups G is disposed is adjacent to the inter-fiber region B in which the lower end connection part of the connection part group G positioned on an upper side among the three connection part groups G is disposed. Similarly, the inter-fiber region B in which the lower end connection part of the connection part group G positioned at a center among the three connection part groups G is disposed is adjacent to the inter-fiber region B in which the upper end connection part of the connection part group G positioned on a lower side among the three connection part groups G is disposed. Since the connection part groups G are adjacent in the disposition direction Y, one connection part 10 is disposed in each inter-fiber region B included in each first high-density region D1. Note that, the connection part groups G may not be adjacent in the disposition direction Y.

In the example of FIG. 1, three connection parts 10 each positioned on a rightmost side among the four connection parts 10 included in each connection part group G of each first high-density region D1 are disposed at substantially the same position as each other in the longitudinal direction X. These three connection parts 10 are in contact with the first right end edge DIRE. Similarly, three connection parts 10 each positioned on a leftmost side among the four connection parts 10 included in each connection part group G are disposed at substantially the same position as each other in the longitudinal direction X. These three connection parts 10 are in contact with the first left end edge D1LE.

In the example of FIG. 1, the connection part group G similar to that of the first high-density region D1 is disposed in each second high-density region D2 (details will be described later). The connection part group G is included in any one of the plurality of first high-density regions D1 and the plurality of second high-density regions D2. Note that, the connection part 10 that does not belong to the connection part group G may be included in the first high-density region D1 and the second high-density region D2.

A number density of the connection parts 10 in each first low-density region S1 is lower than a number density of the connection parts 10 in each first high-density region D1. Similarly, a number density of the connection parts 10 in each second low-density region S2 is lower than a number density of the connection parts 10 in each second high-density region D2. The "number density of the connection parts 10 in the first low-density region S1" is a value obtained by dividing the number of the connection parts 10 included in the first low-density region S1 by an area of the first low-density region S1. The "number density of the connection parts 10 in the first high-density region D1" is a value obtained by dividing the number of the connection parts 10 included in the first high-density region D1 by an area of the first high-density region D1. The number densities of the second low-density region S2 and the second high-density region D2 are similarly defined. In the example of FIG. 1, the connection part 10 is not included in each of the low-density regions S1 and S2. That is, the number densities of the connection parts 10 in the low-density regions S1 and S2 are zero. However, the connection part 10 may be included in the low-density regions S1 and S2.

Hereinafter, configurations of each of the second high-density regions D2 and each of the second low-density regions S2 will be described below. Note that, in the present example, the configuration of each of the second high-density regions D2 is substantially the same as the configuration of each of the first high-density regions D1. Similarly, the configuration of each of the second low-density regions S2 is substantially the same as the configuration of each of the first low-density regions S1.

In each second high-density region D2, among the plurality of connection parts 10, at least two connection parts 10 having different positions from each other in the longitudinal direction X and the disposition direction Y are disposed. In the example of FIG. 1, twelve connection parts 10 are disposed in each second high-density region D2. In the example of FIG. 1, a disposition pattern of the twelve connection parts 10 included in each second high-density region D2 is substantially the same between the second high-density regions D2. More specifically, three connection part groups G are disposed in each second high-density region D2, and the three connection part groups G are disposed in the disposition direction Y. Within each of the connection part groups G, four connection parts 10 are disposed to be continuous in a straight line. In other words, within each second high-density region D2, the twelve connection parts 10 are disposed periodically in the disposition direction Y with four connection parts 10 (connection part group G) as one unit. Note that, the number of connection parts 10 included in each connection part group G may be changed as appropriate, and the number of the connection parts 10 is not limited as long as it is two or more. Within each connection part group G, a plurality of connection parts may be disposed to be continuous in a curved shape. Also, the number of the connection part groups G included in each second high-density region D2 may be changed as appropriate. The number of the connection parts 10 included in each second high-density region D2 may be changed as appropriate, and the number of the connection parts 10 is not limited as long as it is two or more.

In the example of FIG. 1, within each connection part group G, four connection parts 10 are disposed at a substantially constant pitch P3 in the longitudinal direction X. Also, the four connection parts 10 are disposed at substantially constant intervals P4 in the longitudinal direction X. Note that, the four connection parts 10 may be disposed without the intervals P4 in the longitudinal direction X. That is, the connection parts 10 may overlap each other in the disposition direction Y. Also, within each connection part group G, an inter-fiber region B in which a certain connection part 10 is disposed and an inter-fiber region B in which a connection part 10 adjacent to the above-described connection part 10 is disposed are adjacent in the disposition direction Y. The three connection part groups G are adjacent in the disposition direction Y. For example, the inter-fiber region B in which the upper end connection part of the connection part group G positioned at a center among the three connection part groups G is disposed is adjacent to the inter-fiber region B in which the lower end connection part of the connection part group G positioned on an upper side among the three connection part groups G is disposed. Similarly, the inter-fiber region B in which the lower end connection part of the connection part group G positioned at a center among the three connection part groups G is disposed is adjacent to the inter-fiber region B in which the upper end connection part of the connection part group G positioned on a lower side among the three connection part groups G is disposed. Since the connection part groups G are adjacent in the disposition direction Y, one connection part 10 is disposed in each inter-fiber region B included in each second high-density region D2. Note that, the connection part groups G may not be adjacent in the disposition direction Y.

In the example of FIG. 1, three connection parts 10 each positioned on a rightmost side among the four connection parts 10 included in each connection part group G of each second high-density region D2 are disposed at substantially the same position as each other in the longitudinal direction X. These three connection parts 10 are in contact with the second right end edge D2RE. Similarly, three connection parts 10 each positioned on a leftmost side among the four connection parts 10 included in each connection part group G are disposed at substantially the same position as each other in the longitudinal direction X. These three connection parts 10 are in contact with the second left end edge D2LE.

Hereinafter, a positional relationship between each of the first high-density regions D1, each of the first low-density regions S1, each of the second high-density regions D2, and each of the second low-density regions S2 will be described.

Each of the first low-density regions S1 according to the present example has, at least one second low-density region S2 that overlaps therewith in the disposition direction Y. In other words, each first low-density region S1 and each second low-density region S2 overlap each other in the disposition direction Y. A dimension of each overlapping portion in the longitudinal direction X is substantially constant at a dimension L9.

In the present example, the dimension L9 is smaller than the dimension L6 of each first low-density region S1 in the longitudinal direction X and the dimension L8 of each second low-density region S2 in the longitudinal direction X. That is, L9<L6 and L9<L8 are satisfied. Also, the dimension L9 is smaller than the dimension L5 of each first high-density region D1 in the longitudinal direction X and the dimension L7 of each second high-density region D2 in the longitudinal direction X. That is, L9<L5 and L9<L7 are satisfied. That is, the dimension L9 in the longitudinal direction X of a portion of the optical fiber ribbon 1 having a lowest rigidity in the longitudinal direction X (that is, a portion in which the first low-density region S1 and the second low-density region S2 overlap in the disposition direction Y) is smaller than the dimensions L5 to L8. Thereby, it is possible to reduce an area of the portion of the optical fiber ribbon 1 having the lowest rigidity in the longitudinal direction X (that is, the portion of the dimension L9), and enhance the rigidity of the optical fiber ribbon 1 as a whole.

Hereinafter, the connection part 10 positioned on a rightmost side in each inter-fiber region B included in each first high-density region D1 is referred to as a first right end connection part 11R. The connection part 10 positioned on a leftmost side in each inter-fiber region B included in each first high-density region D1 is referred to as a first left end connection part 11L. The connection part 10 positioned on a rightmost side in each inter-fiber region B included in each second high-density region D2 is referred to as a second right end connection part 12R. The connection part 10 positioned on a leftmost side in each inter-fiber region B included in each second high-density region D2 is referred to as a second left end connection part 12L. Note that, in the example of FIG. 1, for all the inter-fiber regions B included in each inter-fiber regions B included in each first high-density region D1, there is only one connection part 10 disposed in each inter-fiber region B. Therefore, each of all the connection parts 10 included in each first high-density region D1 corresponds to both the first right end connection part 11R and the first left end connection part 11L. Similarly, in the example of FIG. 1, each of all the connection parts 10 included in each second high-density region D2 corresponds to both the second right end connection part 12R and the second left end connection part 12L.

In each first high-density region D1, a straight line connecting right ends of two first right end connection parts 11R positioned on a rightmost side is referred to as a first right straight line D1R. Note that, if there are a plurality of positions (points) corresponding to the right ends in each first right end connection part 11R, the first right straight line D1R is defined to connect a midpoint between two points positioned at both ends of the plurality of positions in the disposition direction Y. The same applies to the first left straight line D1L, the second right straight line D2R, and the second left straight line D2L defined below. In each first high-density region D1, a straight line connecting left ends of two first left end connection parts 11L positioned on a leftmost side is referred to as the first left straight line D1L. In each second high-density region D2, a straight line connecting right ends of two second right end connection parts 12R positioned on a rightmost side is referred to as the second right straight line D2R. In each second high-density region D2, a straight line connecting left ends of two second left end connection parts 12L positioned on a leftmost side is referred to as the second left straight line D2L. In the example of FIG. 1, each first right straight line D1R overlaps each first right end edge DIRE, and each first left straight line D1L overlaps each first left end edge D1LE. Similarly, each second right straight line D2R overlaps each second right end edge D2RE.

In the present example, the connection parts 10 overlapping the first right straight line D1R among the plurality of connection parts 10 included in each first high-density region D1 (in the example of FIG. 1, the three connection parts 10 in contact with the first right end edge DIRE) all do not overlap each of a plurality of second right straight lines D2R. Similarly, the connection parts 10 overlapping the first left straight line D1L among the plurality of connection parts 10 included in each first high-density region D1 (in the example of FIG. 1, the three connection parts 10 in contact with the first left end edge D1LE) all do not overlap each of a plurality of second left straight lines D2L. The connection parts 10 overlapping the second right straight line D2R among the plurality of connection parts 10 included in each second high-density region D2 (in the example of FIG. 1, the three connection parts 10 in contact with the second right end edge D2RE) all do not overlap each of a plurality of first right straight lines D1R. The connection parts 10 overlapping the second left straight line D2L among the plurality of connection parts 10 included in each second high-density region D2 (in the example of FIG. 1, the three connection parts 10 in contact with the second left end edge D2LE) all do not overlap each of a plurality of first left straight lines D1L.

Next, an operation of the optical fiber ribbon 1 configured as above will be described.

The optical fiber ribbon 1 according to the present example includes the plurality of first high-density regions D1 and the plurality of second high-density regions D2 in which a large number of connection parts 10 are disposed, and the plurality of first low-density regions S1 and the plurality of second low-density regions S2 in which the number of disposed connection parts 10 are small (particularly, in the example of FIG. 1, no connection part 10 is disposed). Here, in each first high-density regions D1 and each second high-density regions D2, the plurality of optical fibers 20 are connected to each other and are integrated. The connection part 10 also has a role of fixing the disposition pitch P5 between two adjacent optical fibers 20. Therefore, it is possible to stabilize the disposition pitch P5 in each first high-density region D1 and each second high-density region D2.

Incidentally, when an optical fiber ribbon is fusion-spliced to another optical fiber ribbon, a fusion splicer is generally used. A plurality of grooves extending in the longitudinal direction X are formed in the fusion splicer. Inside the fusion splicer, each of the optical fibers 20 included in the optical fiber ribbon is inserted through each of the plurality of grooves described above for positioning. Here, the disposition pitch P5 is fixed by the connection part 10. Therefore, when a fusion work is performed on a certain optical fiber ribbon, conventionally, a fusion splicer having grooves disposed at the disposition pitch P5 of the optical fibers in the optical fiber ribbon has been used.

However, in recent years, research and development has been actively conducted to reduce a diameter of the optical fiber 20, and accordingly, the disposition pitch P5 of the optical fibers 20 has also been reduced. Therefore, in a case of trying to fusion-splice optical fiber ribbons manufactured at different times, since the disposition pitches P5 of the two optical fiber ribbons are different from each other, it is difficult to fusion-splice the two optical fiber ribbons using a fusion splicer.

On the other hand, the optical fiber ribbon 1 according to one or more embodiments has the plurality of first low-density regions S1 and the plurality of second low-density regions S2. In each of the first low-density regions S1 and each of the second low-density regions S2, the connection parts 10 for fixing the disposition pitch P5 between two adjacent optical fibers 20 are not disposed or are few. Therefore, it is possible for the user to change the disposition pitch P5 by pulling or compressing the optical fiber ribbon 1 in the disposition direction Y in the first low-density region S1 or the second low-density region S2. Thereby, when the optical fiber ribbon 1 is fusion-spliced, it is possible to use a fusion splicer having the disposition pitch P5 different from that of the optical fiber ribbon 1. Also, it is possible to fusion-splice the optical fiber ribbon 1 to an optical fiber ribbon having the disposition pitch P5 different from that of the optical fiber ribbon 1.

On the other hand, the optical fiber ribbon 1 may be used as an optical fiber cable by being wrapped in, for example, a wrapping member, a sheath, or the like. In manufacturing such an optical fiber cable, a method in which the optical fiber ribbon 1 and other constituent member (a wrapping member, a sheath, or the like) are joined together while the optical fiber ribbon 1 is moved in the longitudinal direction X is often employed.

Here, a portion in which the connection part 10 is formed between the optical fibers 20 has a higher rigidity than a portion in which the connection part 10 is not provided. Therefore, the rigidity of the optical fiber ribbon 1 in each of the low-density regions S1 and S2 is likely to be lower than the rigidity of the optical fiber ribbon 1 in each of the high-density regions D1 and D2. For example, in a case of an optical fiber ribbon in which a plurality of high-density regions and a plurality of low-density regions are simply disposed alternately in the longitudinal direction (in a case of an optical fiber ribbon having only one of the first region A1 and the second region A2 in the present example), there are portions in which the rigidity is extremely low (low-density regions) in the longitudinal direction of the optical fiber ribbon. In such a case of the optical fiber ribbon having portions with extremely low rigidity, when the optical fiber ribbon is moved, there is a likelihood that the optical fiber ribbon will become corrugated or twisted in the portions in which the rigidity is extremely low. Such corrugation or undulation of the optical fiber ribbon has hindered smooth manufacture of optical fiber cables.

In contrast, the optical fiber ribbon 1 according to one or more embodiments has both the first region A1 and the second region A2, and furthermore, the first region A1 and the second region A2 are offset from each other in the longitudinal direction X. More specifically, each of the first high-density regions D1 and each of the second high-density regions D2 are disposed to be offset from each other in the longitudinal direction X, and each of the first low-density regions S1 and each of the second low-density regions S2 are disposed to be offset from each other in the longitudinal direction X. Thereby, the dimension L9 in the longitudinal direction X of the portion of the optical fiber ribbon 1 in which the rigidity is the lowest in the longitudinal direction X (that is, the portion in which the first low-density region S1 and the second low-density region S2 overlap in the disposition direction Y) becomes smaller. That is, it is possible to make the dimension L9 in the longitudinal direction X of the portion having a particularly low rigidity in the optical fiber ribbon 1 small. Therefore, it is possible to enhance the rigidity of the optical fiber ribbon 1 as a whole, and suppress corrugation or twisting of the optical fiber ribbon 1 when the optical fiber ribbon 1 is moved.

As described above, the optical fiber ribbon 1 according to the present example includes five or more optical fibers 20 disposed in the disposition direction Y, and the plurality of connection parts 10 formed between two optical fibers 20 adjacent in the disposition direction Y to connect the two optical fibers 20, in which the plurality of connection parts 10 are disposed intermittently in the longitudinal direction X and the disposition direction Y, and the optical fiber ribbon 1 includes the plurality of first high-density regions D1 and the plurality of first low-density regions S1 alternately disposed in the longitudinal direction X, and the plurality of second high-density regions D2 and the plurality of second low-density regions S2 alternately disposed in the longitudinal direction X, in which at least two connection parts 10 having different positions from each other in the longitudinal direction X and the disposition direction Y among the plurality of connection parts 10 are disposed in each of the plurality of first high-density regions D1, at least two connection parts 10 having different positions from each other in the longitudinal direction X and the disposition direction Y among the plurality of connection parts 10 are disposed in each of the plurality of second high-density regions D2, a number density of the connection parts 10 in each of the plurality of first low-density regions S1 is lower than a number density of the connection parts 10 in each of the plurality of first high-density regions D1, a number density of the connection parts 10 in each of the plurality of second low-density regions S2 is lower than a number density of the connection parts 10 in each of the plurality of second high-density regions D2, and the dimension L9 in the longitudinal direction X of each portion in which each of the plurality of first low-density regions S1 and each of the plurality of second low-density regions S2 overlap in the disposition direction Y is smaller than the dimension L6 of each of the plurality of first low-density regions S1 in the longitudinal direction X and the dimension L8 of each of the plurality of second low-density regions S2 in the longitudinal direction X.

With this configuration, the first low-density region S1 having a lower rigidity than the first high-density region D1, and the second low-density region S2 having a lower rigidity than the second high-density region D2 are disposed to be offset in the longitudinal direction X. Thereby, the dimension L9 in the longitudinal direction X of the portion having the lowest rigidity in the longitudinal direction X of the optical fiber ribbon 1 (that is, the portion in which the first low-density region S1 and the second low-density region S2 overlap in the disposition direction Y) becomes smaller than, for example, a case in which the first low-density region S1 and the second low-density region S2 are not offset in the longitudinal direction X. Therefore, it is possible to enhance the rigidity of the optical fiber ribbon 1 as a whole, and suppress corrugation or twisting of the optical fiber ribbon 1 when the optical fiber ribbon 1 is moved.

Also, the connection part 10 overlapping the first right straight line D1R among the plurality of connection parts 10 included in each of the plurality of first high-density regions D1 does not overlap each of the plurality of second right straight lines D2R, the connection part 10 overlapping the first left straight line D1L among the plurality of connection parts 10 included in each of the plurality of first high-density regions D1 does not overlap each of the plurality of second left straight lines D2L, the connection part 10 overlapping the second right straight line D2R among the plurality of connection parts 10 included in each of the plurality of second high-density regions D2 does not overlap each of the plurality of first right straight line D1R, and the connection part 10 overlapping the second left straight line D2L among the plurality of connection parts 10 included in each of the plurality of second high-density regions D2 does not overlap each of the plurality of first left straight lines D1L. With this configuration, an offset between the first low-density region S1 and the second low-density region S2 in the longitudinal direction X is further increased. In other words, the dimension L9 becomes even smaller. Thereby, it is possible to further enhance the rigidity of the optical fiber ribbon 1.

Also, the dimension L9 in the longitudinal direction X of each portion in which each of the plurality of first low-density regions S1 and each of the plurality of second low-density regions S2 overlap in the disposition direction Y is smaller than the dimension L5 of each of the plurality of first high-density regions D1 in the longitudinal direction X and the dimension L7 of each of the plurality of second high-density regions D2 in the longitudinal direction X. With this configuration, each of the high-density regions D1 and D2 having a high rigidity has a larger dimension in the longitudinal direction X than the portion of the optical fiber ribbon 1 having a particularly low rigidity in the longitudinal direction X. Therefore, the rigidity of the optical fiber ribbon 1 is further enhanced as a whole.

Also, at least one connection part 10 is disposed in each of the plurality of inter-fiber regions B included in each of the plurality of first high-density regions D1, and at least one connection part 10 is disposed in each of the plurality of inter-fiber regions B included in each of the plurality of second high-density regions D2. With this configuration, separation of the optical fiber ribbon 1 in the disposition direction Y is suppressed in the first high-density region D1 or the second high-density region D2.

Also, at least one connection part 10 is disposed in each of the plurality of first right end edge DIRE and each of the plurality of first left end edge D1LE, and at least one connection part 10 is disposed in each of the plurality of second right end edge D2RE and each of the plurality of second left end edge D2LE. Thereby, it is possible to enhance the rigidity of each first high-density region D1, compared to, for example, a case in which the connection part 10 is not disposed at each first right end edge DIRE and each first left end edge D1LE. Similarly, it is possible to enhance the rigidity of each second high-density region D2, compared to, for example, a case in which the connection part 10 is not disposed at each second right end edge D2RE and each second left end edge D2LE. Therefore, it is possible to enhance the rigidity of the optical fiber ribbon 1 as a whole.

Also, the first region A1, which is a region in which the plurality of first high-density regions D1 and the plurality of first low-density regions S1 are combined, and the second region A2, which is a region in which the plurality of second high-density regions D2 and the plurality of second low-density regions S2 are combined, are adjacent in the disposition direction Y. With this configuration, the optical fiber ribbon 1 being bent with the longitudinal direction X as an axis is suppressed, compared to, for example, a case in which the first region A1 and the second region A2 are not adjacent in the disposition direction Y.

Also, in the disposition direction Y, the dimension L1 of each of the plurality of first high-density regions D1 and the dimension L2 of each of the plurality of first low-density regions S1 are equal to each other, and the dimension L3 of each of the plurality of second high-density regions D2 and the dimension L4 of each of the plurality of second low-density regions S2 are equal to each other. Thereby, it is possible to enhance the rigidity of the optical fiber ribbon 1, compared to, for example, a case in which the dimension L1 is smaller than the dimension L2, and the dimension L3 is smaller than the dimension L4.

Second Example

Next, a second example of one or more embodiments will be described, but a basic configuration is the same as that of the first example. Therefore, components which are the same are denoted by the same reference signs, description thereof will be omitted, and only different points will be described.

Figure 2:
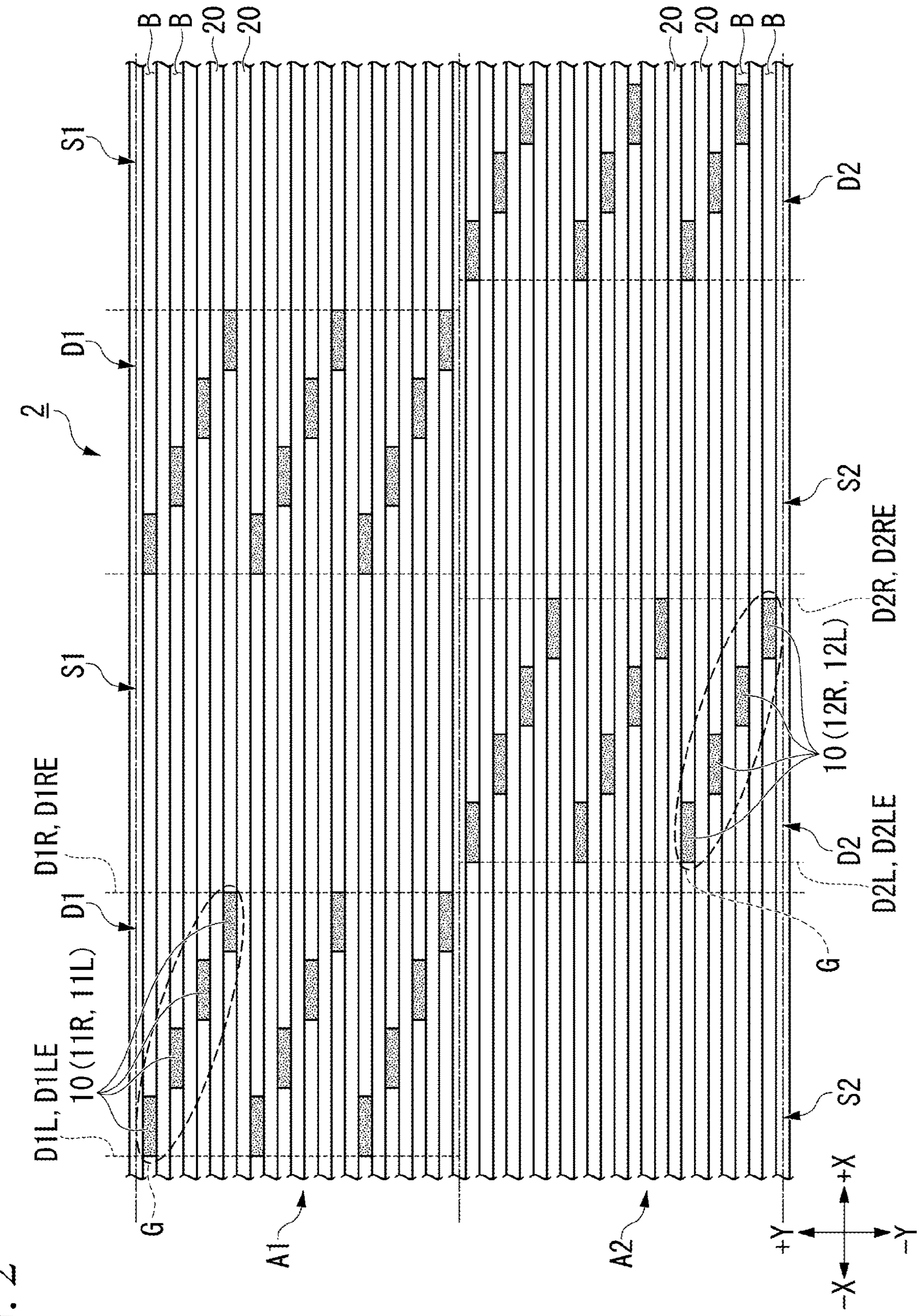
FIG. 2 is a plan view illustrating an optical fiber ribbon according to a second example.

An optical fiber ribbon 2 according to the second example illustrated in FIG. 2 differs from the first example in a positional relationship of regions D1, D2, S1, and S2.

As illustrated in FIG. 2, in the present example, each first high-density region D1 and each second high-density region D2 do not overlap each other in a disposition direction Y. Also, each first low-density region S1 and two second low-density regions S2 closest to the first low-density region S1 are disposed such that end portions thereof in a longitudinal direction X overlap in the disposition direction Y. Similarly, each second low-density region S2 and two first low-density regions S1 closest to the second low-density region S2 are disposed such that end portions thereof in the longitudinal direction X overlap in the disposition direction Y.

In this case, the entire first high-density region D1 in the longitudinal direction X is adjacent to the second low-density region S2 in the disposition direction Y. Similarly, the entire second high-density region D2 in the longitudinal direction X is adjacent to the first low-density region S1 in the disposition direction Y. According to such a disposition, the first low-density region S1, which is a portion with a lower rigidity than the first high-density region D1, is reinforced by the second high-density region D2. Similarly, the second low-density region S2, which is a portion with a lower rigidity than the second high-density region D2, is reinforced by the first high-density region D1.

As described above, in the optical fiber ribbon 2 according to the present example, each of a plurality of first high-density regions D1 and each of a plurality of second high-density regions D2 do not overlap with each other in the disposition direction Y. With such a configuration, it is possible to reinforce the low-density regions S1 and S2 with a lower rigidity by the high-density regions D1 and D2 with a higher rigidity. Therefore, it is possible to enhance the rigidity of the optical fiber ribbon 2 as a whole.

Third Example

Next, a third example of one or more embodiments will be described, but a basic configuration is the same as that of the first example. Therefore, components which are the same are denoted by the same reference signs, description thereof will be omitted, and only different points will be described.

Figure 3:
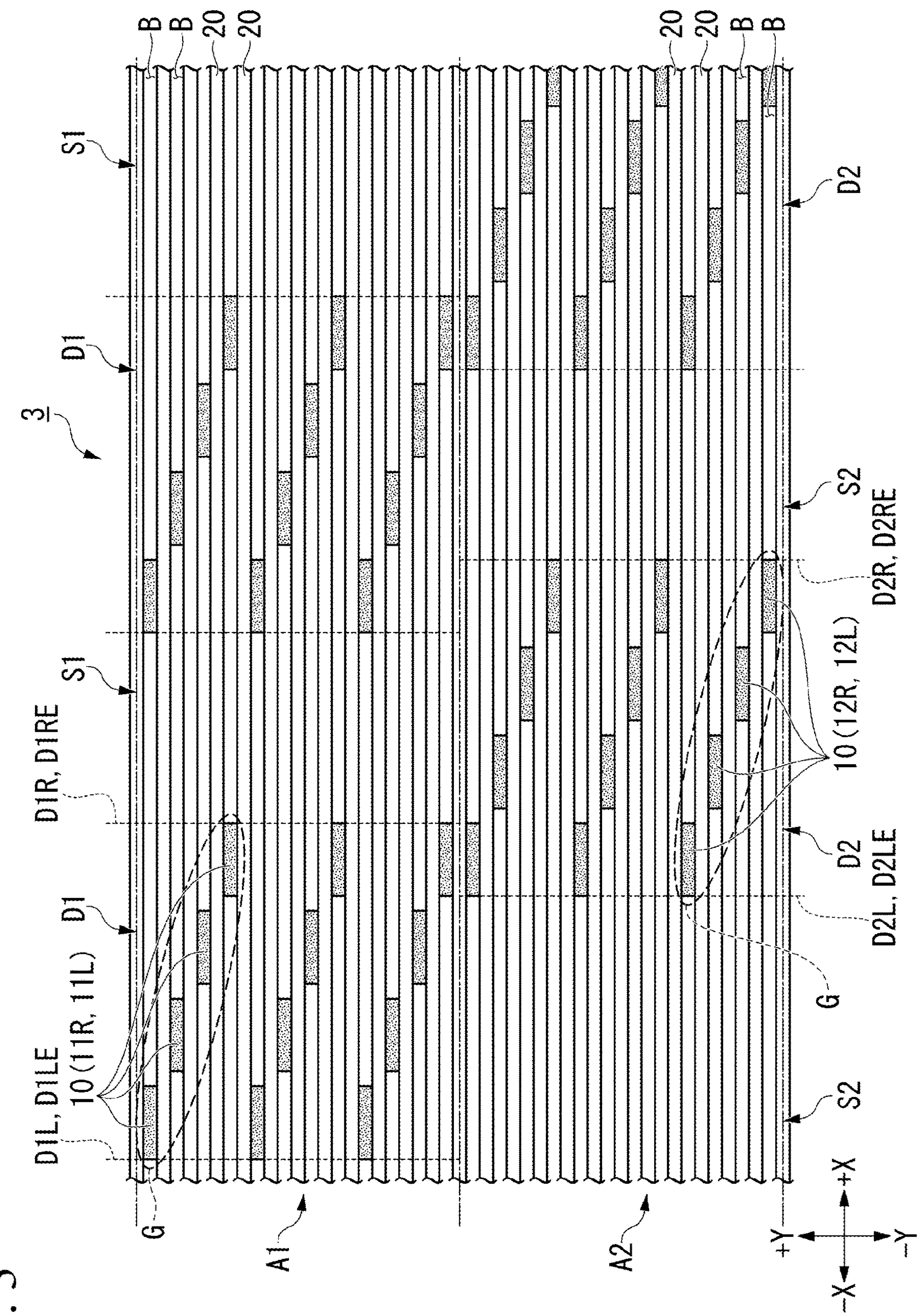
FIG. 3 is a plan view illustrating an optical fiber ribbon according to a third example.

An optical fiber ribbon 3 according to the third example illustrated in FIG. 3 differs from the first example in a positional relationship of regions D1, D2, S1, and S2.

As illustrated in FIG. 3, in the present example, each first low-density region S1 and each second low-density region S2 do not overlap with each other in a disposition direction Y. Also, each first high-density region D1 and two second high-density regions D2 closest to the first high-density region D1 are disposed such that end portions thereof in a longitudinal direction X overlap in the disposition direction Y. Similarly, each second high-density region D2 and two first high-density regions D1 closest to the second high-density region D2 are disposed such that end portions thereof in the longitudinal direction X overlap in the disposition direction Y.

In this case, the first high-density region D1 or the second high-density region D2 is disposed at any position in the longitudinal direction X of the optical fiber ribbon 3. Therefore, a region with a high rigidity is disposed at any position in the longitudinal direction X of the optical fiber ribbon 3.

As described above, in the optical fiber ribbon 3 according to the present example, each of a plurality of first low-density regions S1 and each of a plurality of second low-density regions S2 do not overlap with each other. With such a configuration, it is possible to enhance a rigidity of the optical fiber ribbon 3 more reliably.

Fourth Example

Next, a fourth example of one or more embodiments will be described, but a basic configuration is the same as that of the first example. Therefore, components which are the same are denoted by the same reference signs, description thereof will be omitted, and only different points will be described.

Figure 4:
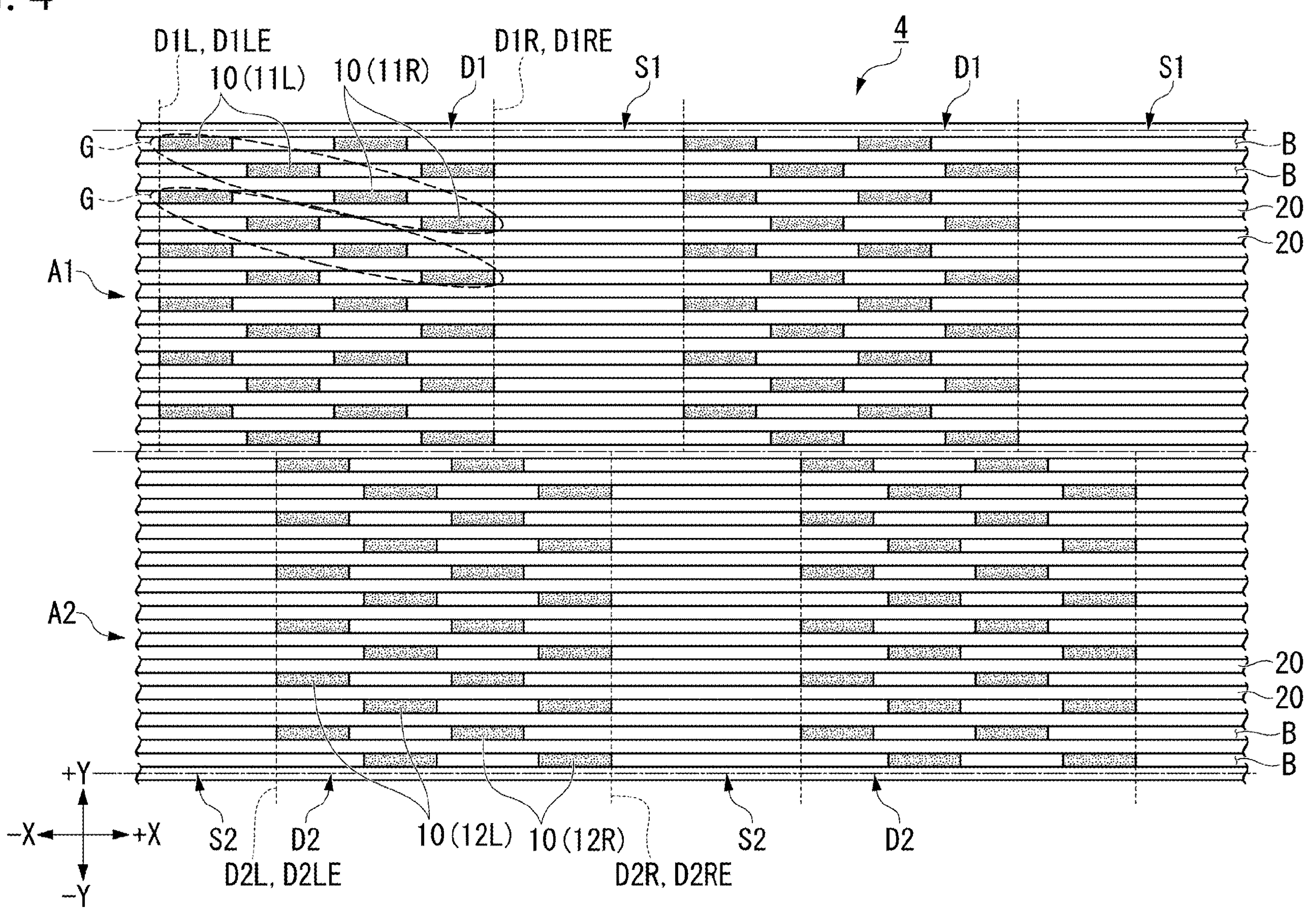
FIG. 4 is a plan view illustrating an optical fiber ribbon according to a fourth example.

An optical fiber ribbon 4 according to the fourth example illustrated in FIG. 4 differs from the first example in a configuration of each of the high-density regions D1 and D2.

As illustrated in FIG. 4, in the optical fiber ribbon 4 according to the present example, a plurality (two in FIG. 4) of connection parts 10 are disposed in each of a plurality (twelve in FIG. 4) of inter-fiber regions B included in each of the high-density regions D1 and D2. In the example of FIG. 4, twenty four connection parts 10 are disposed in each of the high-density regions D1 and D2. Note that, three or more connection parts 10 may be disposed in each of the inter-fiber regions B. Different number of connection parts 10 may be disposed in each of the inter-fiber regions B.

Like this way, when a plurality of connection parts 10 are included in each inter-fiber region B in the high-density regions D1 and D2, the connection part 10 corresponding to a first right end connection part 11R, and the connection part

10 corresponding to a first left end connection part 11L are different from each other in each inter-fiber region B.

According to the optical fiber ribbon 4 according to the present example, it is possible to obtain the same operation and effect as those of the optical fiber ribbon 1 according to the first example. Also, by increasing the number of the connection parts 10 disposed in each inter-fiber region B, it is possible to enhance a rigidity of the optical fiber ribbon 4 in each of the high-density regions D1 and D2. Thereby, it is possible to further enhance the rigidity of the optical fiber ribbon 4 as a whole.

Fifth Example

Next, a fifth example of one or more embodiments will be described, but a basic configuration is the same as that of the first example. Therefore, components which are the same are denoted by the same reference signs, description thereof will be omitted, and only different points will be described.

Figure 5:
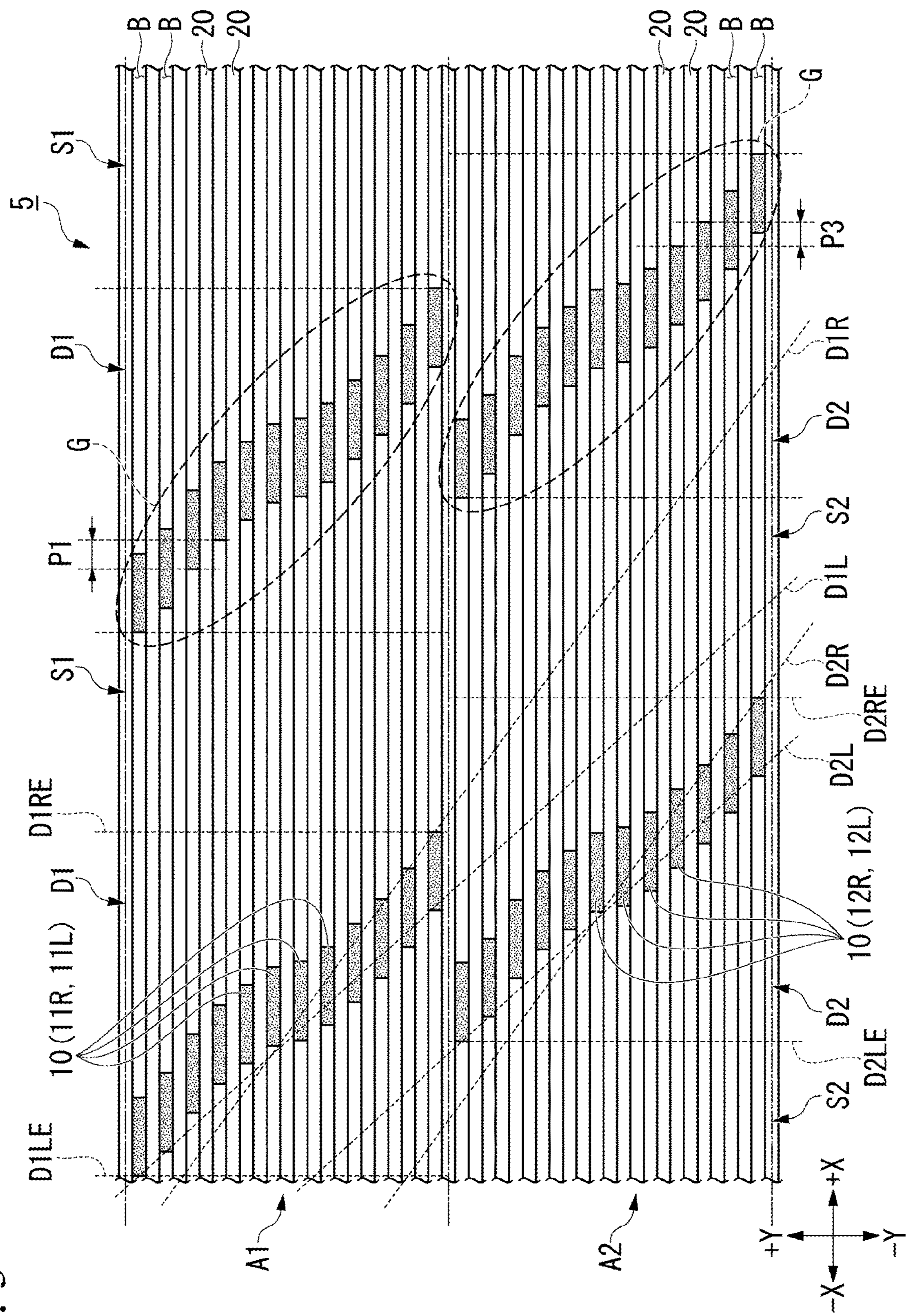
FIG. 5 is a plan view illustrating an optical fiber ribbon according to a fifth example.

An optical fiber ribbon 5 according to the fifth example illustrated in FIG. 5 differs from the first example in a configuration of each of the high-density regions D1 and D2.

As illustrated in FIG. 5, in the optical fiber ribbon 5 according to the present example, one connection part group G is disposed in each of the high-density regions D1 and D2. Also, within the connection part group G, a plurality (twelve in FIG. 5) of connection parts 10 are disposed to be continuous. Particularly, in the example of FIG. 5, twelve connection parts are continuous in a curved shape. In other words, pitches P1 and P3 at which the connection parts 10 are disposed within the connection part group G included in each of the high-density regions D1 and D2 are not constant.

In this case, in each first high-density region D1, a first right end edge D1RE and a first right straight line D1R do not overlap, and a first left end edge D1LE and a first left straight line D1L do not overlap. Similarly, in each second high-density region D2, a second right end edge D2RE and a second right straight line D2R do not overlap, and a second left end edge D2LE and a second left straight line D2L do not overlap. Note that, also in the optical fiber ribbon 5 according to the present example, among the plurality of connection parts 10 included in each first high-density region D1, the connection part 10 overlapping the first right straight line D1R does not overlap each of the plurality of second right straight lines D2R. Similarly, among the plurality of connection parts 10 included in each first high-density region D1, the connection part 10 overlapping the first left straight line D1L does not overlap each of the plurality of second left straight lines D2L. Among the plurality of connection parts 10 included in each second high-density region D2, the connection part 10 overlapping the second right straight line D2R does not overlap each of the plurality of first right straight lines D1R. Among the plurality of connection parts 10 included in each second high-density region D2, the connection part 10 overlapping the second left straight line D2L does not overlap each of the plurality of first left straight lines D1L.

According to the optical fiber ribbon 5 according to the present example, it is possible to obtain the same operation and effect as those of the optical fiber ribbon 1 according to the first example. Also, since the plurality of connection parts 10 included in each of the high-density regions D1 and D2 are continuous as one connection part group G, it is possible to dispose the plurality of connection parts 10 in the manner of a traversable figure (a figure written in one stroke) for each of the high-density regions D1 and D2. Thereby, for example, when a dispenser that discharges a resin to be the connection part 10 is moved at the time of manufacturing the optical fiber ribbon 5, a movement distance of the dispenser is reduced and a manufacturing efficiency is improved.

Sixth Example

Next, a sixth example of one or more embodiments will be described, but a basic configuration is the same as that of the first example. Therefore, components which are the same are denoted by the same reference signs, description thereof will be omitted, and only different points will be described.

Figure 6:
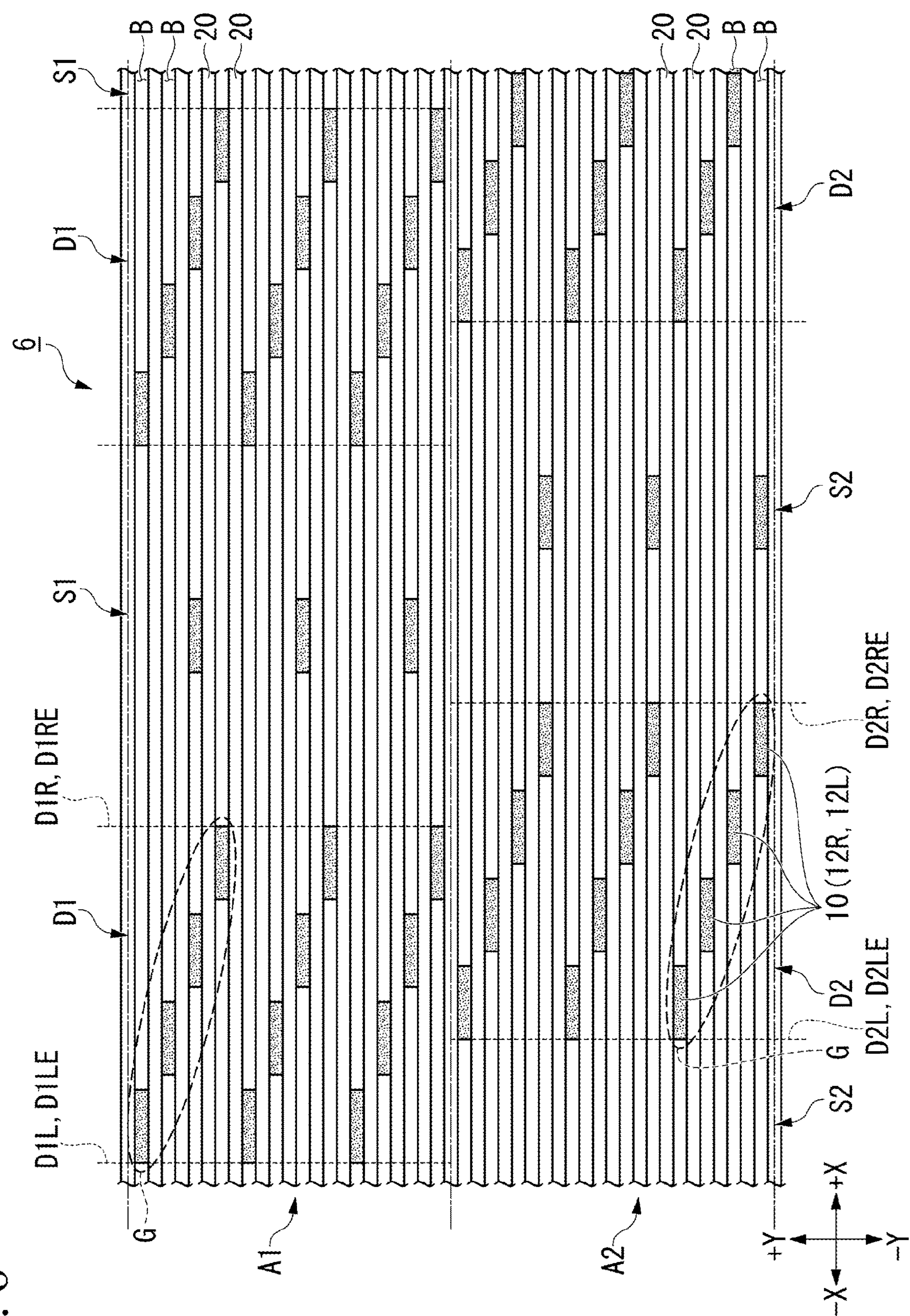
FIG. 6 is a plan view illustrating an optical fiber ribbon according to a sixth example.

An optical fiber ribbon 6 according to the sixth example illustrated in FIG. 6 differs from the first example in a configuration of each of the low-density regions S1 and S2.

As illustrated in FIG. 6, in the optical fiber ribbon 6 according to the present example, a connection part 10 is disposed in each of the low-density regions S1 and S2. Note that, also in the optical fiber ribbon 6 according to the present example, a number density of the connection parts 10 in each first low-density region S1 is lower than a number density of the connection parts 10 in each first high-density region D1. Similarly, a number density of the connection parts 10 in each second low-density region S2 is lower than a number density of the connection parts 10 in each second high-density region D2.

According to the optical fiber ribbon 6 according to the present example, it is possible to obtain the same operation and effect as those of the optical fiber ribbon 1 according to the first example. Also, since the connection part 10 is also disposed in each of the low-density regions S1 and S2, it is possible to enhance a rigidity of the optical fiber ribbon 6 in each of the low-density regions S1 and S2. Thereby, it is possible to enhance the rigidity of the optical fiber ribbon 6 as a whole. Also, when the optical fiber ribbon 6 is fusion-spliced, it is possible to change a pitch between optical fibers 20 by peeling off the connection parts 10 included in the low-density regions S1 and S2. Since the number of connection parts 10 included in the low-density regions S1 and S2 is small, it is easy to peel them off.

Note that, in the present specification, for example, "substantially equal" also includes a case in which it may be regarded as being equal if manufacturing errors are removed. The same applies to other expressions using "substantially". That is, expressions using "substantially" also include cases in which the meaning indicated by the words following "substantially" may be regarded as being established if manufacturing errors are removed.

Note that, the technical scope of the present invention is not limited to the above-described embodiments, and various modifications may be made in a range not departing from the meaning of the present invention.

For example, in the embodiments described above, L9<L6 and L9<L8 have been satisfied for each of the plurality of first high-density regions D1, the plurality of first low-density regions S1, the plurality of second high-density regions D2, and the plurality of second low-density regions S2. However, when L9<L6 and L9<L8 are satisfied for at least one of the first high-density region D1, first low-density region S1, second high-density region D2, and second low-density region S2, it is possible to obtain an effect of enhancing a rigidity in the portion. The same applies to other dimensional relationships.

Also, a disposition pattern of the plurality of connection parts 10 included in each of the first high-density regions D1 may not be the same between the first high-density regions D1. Similarly, a disposition pattern of the plurality of connection parts 10 included in each of the second high-density regions D2 may not be the same between the second high-density regions D2.

Also, dimensions of each connection part 10 in the longitudinal direction X and the disposition direction Y may not be the same between the connection parts 10.

Also, the plurality of connection parts 10 included in each of the high-density regions D1 and D2 may not form the connection part group G. In other words, the plurality of connection parts 10 may be randomly disposed in each of the high-density regions D1 and D2. Similarly, the plurality of connection parts 10 may be randomly disposed in each of the low-density regions S1 and S2.

Also, if there are a plurality of connection parts 10 being included in the first high-density region D1 and overlapping the first right straight line D1R, some of the plurality of connection parts 10 may overlap the second right straight line D2R. However, a configuration in which all of the plurality of connection parts 10 do not overlap the second right straight line D2R has a larger offset between the first low-density region S1 and the second low-density region S2 in the longitudinal direction X, and this is suitable because it is possible to enhance the rigidity of the optical fiber ribbon 1 more reliably. The same applies when there are a plurality of connection parts 10 being included in the first high-density region D1 and overlapping the first left straight line D1L. The same applies when there are a plurality of connection parts 10 being included in the second high-density region and overlapping the second right straight line D2R. The same applies when there are a plurality of connection parts 10 being included in the second high-density region and overlapping the second left straight line D2L.

In addition, the components in the above-described embodiments may be appropriately replaced with well-known components within a range not departing from the meaning of the present invention, and the embodiments and modified examples described above may be appropriately combined. Although the disclosure has been described with respect to only a limited number of embodiments, those skilled in the art, having benefit of this disclosure, will appreciate that various other embodiments may be devised without departing from the scope of the present invention. Accordingly, the scope of the invention should be limited only by the attached claims.

REFERENCE SIGNS LIST

1 to 6 Optical fiber ribbon
10 Connection part
11R First right end connection part
11L First left end connection part
12R Second right end connection part
12L Second left end connection part
20 Optical fiber
D1 First high-density region
D1R First right straight line
DIRE First right end edge (End edge of first high-density region in longitudinal direction)
D1L First left straight line
D1LE First left end edge (End edge of first high-density region in longitudinal direction)
D2 Second high-density region
D2R Second right straight line
D2RE Second right end edge (End edge of second high-density region in longitudinal direction)
D2L Second left straight line
D2LE Second left end edge (End edge of second high-density region in longitudinal direction)
S1 First low-density region
S2 Second low-density region
A1 First region
A2 Second region
X Longitudinal direction
Y Disposition direction

The invention claimed is:

1. An optical fiber ribbon comprising:
five or more optical fibers disposed in a disposition direction perpendicular to a longitudinal direction of the optical fiber ribbon; and
connection parts disposed intermittently in the longitudinal direction and the disposition direction, wherein each of the connection parts is disposed between and connects adjacent ones of the optical fibers, wherein
the optical fiber ribbon has:
first high-density regions and first low-density regions alternately disposed in the longitudinal direction; and
second high-density regions and second low-density regions alternately disposed in the longitudinal direction,
each of the first high-density regions includes at least two of the connection parts that have different positions from each other in the longitudinal direction and the disposition direction,
each of the second high-density regions includes at least another two of the connection parts that have different positions from each other in the longitudinal direction and the disposition direction,
a number density of the connection parts in each of the first low-density regions is lower than a number density of the connection parts in each of the first high-density regions,
a number density of the connection parts in each of the second low-density regions is lower than a number density of the connection parts in each of the second high-density regions,
a dimension in the longitudinal direction of a portion in which one of the first low-density regions and one of the second low-density regions overlap in the disposition direction is smaller than a dimension of the one of the first low-density regions in the longitudinal direction and a dimension of the one of the second low-density regions in the longitudinal direction,
none of the first low-density regions includes a connection part,
none of the second low-density regions includes a connection part,
the number density of the connection parts is constant among the first high-density regions, and
the number density of the connection parts is constant among the second high-density regions.

2. The optical fiber ribbon according to claim 1, wherein the connection parts include:
first right end connection parts positioned on a rightmost side in each inter-fiber region between adjacent ones of the optical fibers in one of the first high-density regions;
first left end connection parts positioned on a leftmost side in each inter-fiber region between adjacent ones of the optical fibers in the one of the first high-density regions;
second right end connection parts positioned on a rightmost side in each inter-fiber region between adjacent ones of the optical fibers in one of the second high-density regions; and second left end connection parts positioned on a left-most side in each inter-fiber region between adjacent ones of the optical fibers in the one of the second high-density regions, a first right straight line connects right ends of two of the first right end connection parts on a rightmost side in the one of the first high-density regions, a first left straight line connects left ends of two of the first left end connection parts on a leftmost side in the one of the first high-density regions, a second right straight line connects right ends of two of the second right end connection parts on a rightmost side in the one of the second high-density regions, a second left straight line connects left ends of two of the second left end connection parts on a leftmost side in the one of the second high-density regions, one of the connection parts that is in the one of the first high-density regions and that overlaps the first right straight line does not overlap the second right straight line, one of the connection parts that is in the one of the first high-density regions and that overlaps the first left straight line does not overlap the second left straight line, one of the connection parts that is in the one of the second high-density regions and that overlaps the second right straight line does not overlap the first right straight line, and one of the connection parts that is in the one of the second high-density regions and that overlaps the second left straight line does not overlap the first left straight line.

3. The optical fiber ribbon according to claim 1, wherein the dimension in the longitudinal direction of a portion in which the one of the first low-density regions and the one of the second low-density regions overlap in the disposition direction is smaller than a dimension of one of the first high-density regions in the longitudinal direction and a dimension of one of the second high-density regions in the longitudinal direction.

4. The optical fiber ribbon according to claim 1, wherein at least one of the connection parts is disposed in each inter-fiber region between adjacent ones of the optical fibers in one of the first high-density regions, and at least one of the connection parts is disposed in each inter-fiber region between adjacent ones of the optical fibers in one of the second high-density regions.

5. The optical fiber ribbon according to claim 1, wherein at least one of the connection parts is disposed on each of two opposite end edges of one of the first high-density regions in the longitudinal direction, and at least another one of the connection parts is disposed on each of two opposite end edges of one of the second high-density regions in the longitudinal direction.

6. The optical fiber ribbon according to claim 1, wherein a first region including one of the first high-density regions and the one of the first low-density regions is adjacent to a second region including one of the second high-density regions and the one of the second low-density regions in the disposition direction.

7. The optical fiber ribbon according to claim 1, wherein, in the disposition direction, a dimension of one of the first high-density regions is equal to a dimension of the one of the first low-density regions, and a dimension of one of the second high-density regions is equal to a dimension of the one of the second low-density regions.

8. The optical fiber ribbon according to claim 1, wherein one of the first high-density regions does not overlap one of the second high-density regions in the disposition direction.

9. The optical fiber ribbon according to claim 1, wherein the one of the first low-density region does not overlap the one of the second low-density regions in the disposition direction.

10. An optical fiber ribbon comprising:

five or more optical fibers disposed in a disposition direction perpendicular to a longitudinal direction of the optical fiber ribbon; and connection parts disposed intermittently in the longitudinal direction and the disposition direction, wherein each of the connection parts is disposed between and connects adjacent ones of the optical fibers, wherein the optical fiber ribbon has:

a first high-density region and a first low-density region disposed at different positions in the longitudinal direction; and a second high-density region and a second low-density region disposed at different positions in the longitudinal direction, the first high-density region includes at least two of the connection parts that have different positions from each other in the longitudinal direction and the disposition direction, the second high-density region includes at least another two of the connection parts that have different positions from each other in the longitudinal direction and the disposition direction, a number density of the connection parts in the first low-density region is lower than a number density of the connection parts in the first high-density region, a number density of the connection parts in the second low-density region is lower than a number density of the connection parts in the second high-density region, a dimension in the longitudinal direction of a portion in which the first low-density region and the second low-density region overlap in the disposition direction is smaller than a dimension of the first low-density region in the longitudinal direction and a dimension of the second low-density region in the longitudinal direction, and in the longitudinal direction, a left end of the first low-density region is offset from a left end of the second low-density region and a right end of the first low-density region is offset from a right end of the second low-density region.

11. An optical fiber ribbon comprising:

five or more optical fibers disposed in a disposition direction perpendicular to a longitudinal direction of the optical fiber ribbon; and connection parts disposed intermittently in the longitudinal direction and the disposition direction, wherein each of the connection parts is disposed between and connects adjacent ones of the optical fibers, wherein the optical fiber ribbon has:

a first high-density region and a first low-density region disposed at different positions in the longitudinal direction; and a second high-density region and a second low-density region disposed at different positions in the longitudinal direction, the first high-density region includes at least two of the connection parts that have different positions from each other in the longitudinal direction and the disposition direction, the second high-density region includes at least another two of the connection parts that have different positions from each other in the longitudinal direction and the disposition direction, a number density of the connection parts in the first low-density region is lower than a number density of the connection parts in the first high-density region, a number density of the connection parts in the second low-density region is lower than a number density of the connection parts in the second high-density region, a dimension in the longitudinal direction of a portion in which the first low-density region and the second low-density region overlap in the disposition direction is smaller than a dimension of the first low-density region in the longitudinal direction and a dimension of the second low-density region in the longitudinal direction, the first low-density region does not include a connection part, the second low-density region does not include a connection part, and a boundary between the first high-density region and the second high-density region in the disposition direction is located at a center of the optical fiber ribbon in the disposition direction.

* * * * *